July 31, 1962 J. A. DOREMUS 3,047,657

AUTOMATIC KEYING SYSTEM

Filed May 2, 1960 2 Sheets-Sheet 1

INVENTOR
JOHN A. DOREMUS

BY
Mead, Browne, Schuyler & Beveridge
ATTORNEYS

July 31, 1962 J. A. DOREMUS 3,047,657

AUTOMATIC KEYING SYSTEM

Filed May 2, 1960 2 Sheets-Sheet 2

INVENTOR
JOHN A. DOREMUS

BY
Mead, Browne, Schuyler & Beveridge
ATTORNEYS

United States Patent Office 3,047,657
Patented July 31, 1962

3,047,657
AUTOMATIC KEYING SYSTEM

John A. Doremus, Denville, N.J., assignor to Aircraft Radio Corporation, Boonton, N.J., a corporation of New Jersey Filed May 2, 1960, Ser. No. 25,989
2 Claims. (Cl. 178—17)

This invention relates to automatic keying equipment and particularly concerns the automatic transmission of a message which has been previously coded upon a record medium such as magnetic tape.

It is a major object of the invention to provide a code keying system with reliable response to signals on the record medium and independent of random signals that may occur.

More specifically, it is an object of the invention to provide a code keying system in which there is no confusion between "start" signals and "stop" signals so the transmitter is reliably keyed to "start" and "stop" in accordance with the signals on the medium.

In the attainment of these objects, "start" and "stop" signals are recorded on separate tracks of a multitrack record medium and separate "start" and "stop" sensing devices are transversely spaced with respect to the record medium to respectively sense the "start" and "stop" signals on separate tracks of the medium. To control the keying circuit for a transmitter, a bistable circuit is coupled to the two sensing devices so it is shifted to one stable condition in response to a "start" signal from the "start" sensing device, and its other stable condition in response to a "stop" signal from the "stop" sensing device. Connections from the bistable circuit control a transmitter keying circuit to render it operative when the bistable circuit is in its one stable condition in response to a "start" signal and to render the keying circuit inoperative when the bistable circuit in its other stable condition in response to a "stop" signal.

In the case of a magnetic tape record medium, magnetic alternations are formed in separate tracks so an alternation of a certain polarity on one track represents a "start" signal and an alternation of a certain polarity on the other track represents a "stop" signal. By controlling the bistable circuit in this way, the keying circuit of the transmitter is operative during the interval between a "start" signal and a "stop" signal and inoperative during the interval between a "stop" signal and a "start" signal. Since the alternations for the "start" and "stop" signals are on separate tracks of the medium, the system is arranged to recognize only the particular polarity of the alternation in the respective tracks and ignores random alternations which occur between the recorded signals. This assures reliable keying under all conditions.

Other objects, advantages, and features of the invention will become apparent from the following specification read in conjunction with the accompanying drawings wherein.

Figure 1:
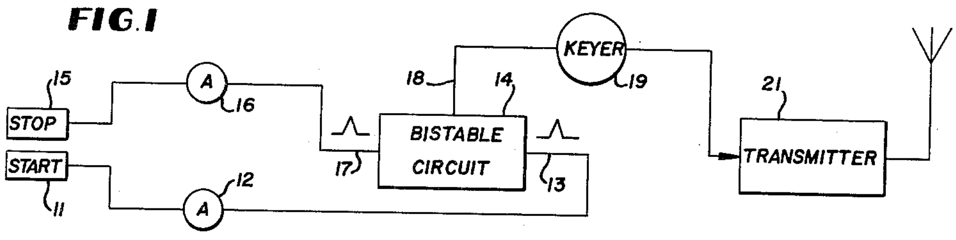
FIG. 1 is a block diagram showing essential components of a keying system embodying the invention.

In the block diagram illustrated in FIG. 1, conventional sensing heads 11 and 15 are actuated by signals on a record medium to generate electrical impulses which are amplified by amplifiers 12 and 16, respectively, and coupled to separate input circuits 13 and 17 of a bistable circuit 14. Bistable circuit 14 is shiftable between two stable conditions, which may be designated as "start" and "stop" conditions. When the bistable circuit is in its "start" condition the output of lead 18 controls keyer 19 to operate transmitter 21. Conversely, when the bistable circuit is in its "stop" condition, the keyer 19 is controlled to prevent transmission by transmitter 21. In the block diagram of FIG. 1, transmitter 21 may be of a conventional C.W. type.

Any form of record medium, such as paper tapes with ink markings, conductive markings, or perforations may be employed with suitable sensing heads such as photoelectrical devices, brushes, or brush feelers, respectively. In the preferred embodiment of the invention the record medium is a magnetic tape 22, shown in FIGS. 3 and 4, in which the intelligence is stored on the tape by magnetizing small areas of different tracks on the tape according to a code. In the tapes shown in FIGS. 3 and 4, the lower track carries magnetized elemental areas defining start signals, which, when moved past "start" sensing head 11, generates an impulse to shift the bistable circuit from its normal "stop" stable condition to a "start" stable condition causing an output signal to appear on lead 18. This will in turn operate the keyer 19 to start the transmission of a C.W. signal by transmitter 21 which will continue until bistable circuit 14 is returned to its stop condition by a signal applied to input 17.

Figure 3:
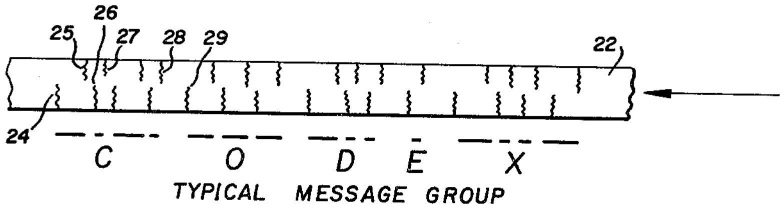
FIG. 3 is an illustration of a magnetic tape type keying medium showing the distribution of local magnetic poles.
Figure 4:
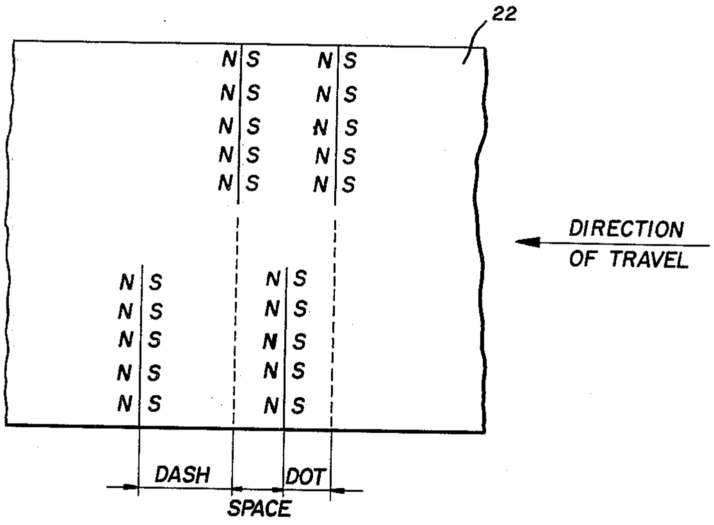
FIG. 4 is an illustration of a portion of magnetic tape showing a typical message group recorded in Morse code.

The upper track of the tape shown in FIGS. 3 and 4 carries magnetized elemental areas defining "stop" signals. These are stored on the tape alternately with respect to the "start" signals stored on the lower track so that following storage of each "start" signal on the lower track, a "stop" signal is stored on the upper track. This "stop" signal when moved past "stop" sensing head 15, spaced transversely of the record medium relative to "start" sensing head 11, generates a signal which is applied to the bistable circuit to shift the bistable circuit to its "stop" stable condition. In this condition output lead 18 controls keyer 19 to prevent transmission of a signal by transmitter 21.

Referring to FIG. 3, alternately impressed "stop" and "start" signals are shown respectively as upper and lower tracks on a dual track tape, and represent, in the Morse code, the letter "C" by a dash-dot-dash-dot sequence of transmission. Starting from the left-hand side of the tape as shown in FIG. 3, a "start" signal 24 is stored on the magnetic tape as a magnetized elemental area. When the tape is moved past sensing head 11, "start" signal 24 generates an impulse which is amplified by amplifier 12 and applied to input 13 of bistable circuit 14. This shifts the bistable circuit to its alternate condition of stable operation to control keyer 19 which actuates transmitter 21 to start the transmission of a C.W. signal. This transmitted signal continues as long as the bistable circuit is in its shifted condition. A "stop" signal 25, is stored on the upper track of the record medium 22 and spaced longitudinally from the "start" signal 24 by a distance corresponding to the time duration of a dash impulse. When "stop" signal 25 is moved past sensing head 15, an impulse is generated which is applied through amplifier 16 to input 17 of the bistable circuit 14, shifting bistable 14 to its initial stable condition to control keyer 19 so the transmitter 21 is off. When "start" signal 26 is moved past sensing head 11 a signal is generated, which is applied to bistable circuit 14. This will shift bistable circuit 14 to its alternate condition of stable operation and close keyer 19 to again initiate the transmission of a C.W. signal. "Stop" signal 27 is spaced longitudinally on the upper track from "start" signal 26 a distance corresponding to the time duration of a dot according to the Morse code.

When "stop" signal 27 is moved past the "stop" sensing head 15, an impulse is generated and applied to bistable circuit 14 again shifting it to its initial stable condition to control keyer 19 and terminate the transmission of a C.W. pulse. This shifting of bistable circuit 14 between its two stable conditions continues until the letter C has been transmitted. At the end of the letter C, "stop" signal 28 on the upper track terminates the transmission. The longitudinal distance on the record medium between the storage of "stop" signal 28 on the upper track and "start" signal 29 on the lower track corresponds to the time duration of a space interval as employed in the Morse code.

Figure 2:
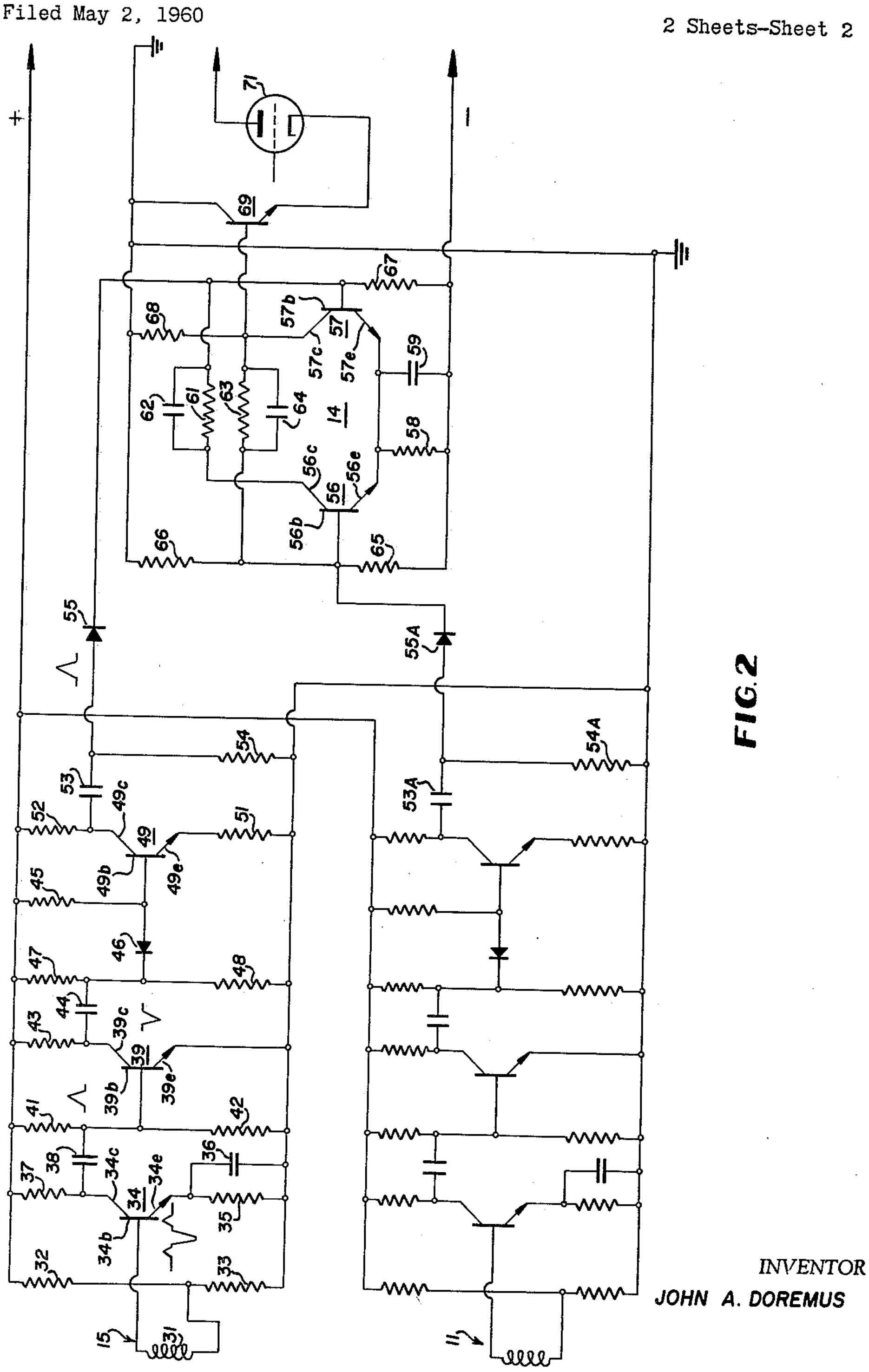
FIG. 2 is a schematic diagram of portions of the block diagram shown in FIG. 1.

Since the amplifiers in the "stop" channel and "start" channel are alike in the circuit diagram shown in FIG. 2, only the amplifier associated with the "stop" channel will be described. Resistors 32 and 33 form a voltage divider to supply proper biasing potentials to base *34b* of transistor 34. Resistor 35 in the circuit of emitter *34c* of transistor 34 is by-passed by capacitor 36 to provide direct current stability. Resistor 37 is a load resistor for collector *34c*. Capacitor 38 couples the output taken off of collector *34c* to the base *39b* of transistor 39. Transistor 39 has its base *39b* biased by a voltage divider formed by resistors 41 and 42. Resistor 43 serves as a load for the collector *39c* of transistor 39. Coupling capacitor 44 couples the amplified impulse through a polarity sensitive device, such as diode 46, to the base of transistor 49. Diode 46 is connected in the circuit to pass impulses of proper polarity and magnitude and is biased through resistor 45 and a voltage divider formed by resistors 47 and 48. The signal passed by diode 46 is applied directly to the base of transistor 49. Resistors 51 and 52 serve as load resistors for the emitter *49e* and collector *49c* respectively of transistor 49.

Capacitor 53 and resistor 54 form an output circuit for the amplifier to apply pulses at the collector *49c* of transistor 49 through another polarity sensitive device, such as diode 55, to bistable circuit 14. Diode 55 is arranged to allow a pulse of proper polarity to pass to the bistable circuit for switching purposes. Similarly, capacitor 53A and resistor 54A form an output circuit for the amplifier in the "start" channel. This output is connected through diode 55A to bistable circuit 14.

Bistable circuit 14 includes a pair of transistors 56 and 57 connected in a multivibrator circuit with a common emitter resistor 58 by-passed by a capacitor 59. The collector *56c* of transistor 56 is cross-connected to the base *57b* of transistor 57 by an R-C network which includes resistor 61, and capacitor 62. The collector *57c* of transistor 57 is cross-connected to the base *56b* of transistor 56 by an R-C network which includes resistor 63 and capacitor 64. Resistors 65 and 66, connected across a source of negative potential, have their junction connected to the base *56b* of transistor 56, so that initially, transistor 56 is biased into conduction and may be said to be on. Due to the cross-connection of resistor 61 and capacitor 62 between the collector *56c* of transistor 56 and the base *57b* of transistor 57, transistor 57 is rendered non-conductive or off. Transistor 57 has a base resistor 67 and a collector load resistor 68 forming an output from the bistable circuit to control a keying transistor 69 in circuit with modulation tube 71 of the transmitter.

Initially, transistor 69 is non-conductive so that the sending device is "off." When a stored signal on the lower track of a recording medium shown in FIG. 3 moves past the sensing head 11, an impulse is generated which is amplified and inverted to apply a positive pulse to the base *56b* of transistor 56 and renders transistor 56 non-conductive, while simultaneously switching transistor 57 on. When transistor 57 is conductive an output voltage appears across the emitter load resistor 68 which switches the keying transistor 69 on so it is conductive and the transmitter is operative. In this condition a C.W. signal is sent by the transmitter or sending device. The bistable circuit will remain in this "on" condition until a pulse is applied to the base *57b* of transistor 57. This again shifts the bistable circuit to its initial stable condition where no transmissions are effected by the sending device. Pulses applied to the base of transistor 57 are derived from the signals stored on the upper track of the record medium as these signals are moved past the "stop" sensing head 15.

While I have shown and described a general embodiment of the invention as well as one detailed embodiment, it will be obvious to those skilled in the art that many modifications may be made without departing from the scope of the invention as defined by the appended claims.

What is claimed is:

1. A code keying system comprising means for feeding a record medium along a path, a pair of sensing devices spaced transversely of said path and responsive to data stored on separate tracks of a multi-track record medium moving along said path for respectively producing signals, a keying circuit, and means coupling each of said sensing devices to said keying circuit such that said sensing devices alternately render said keying circuit operative or inoperative according to a code on the record medium, means including polarity sensitive devices for limiting the outputs of said coupling means to signals of a selected polarity.

2. A code keying system comprising means for feeding a multi-track magnetic record medium along a path, one track of said record medium having magnetized elemental areas of a predetermined magnetic polarity representative of a "start" signal, and another parallel track of said record medium having magnetized elemental areas of said predetermined polarity representative of a "stop" signal, said elemental areas being alternately placed on the tracks of said medium, respectively, a pair of aligned sensing devices spaced transversely of the medium to sense magnetized areas of said respective tracks of said predetermined polarity, a bistable circuit coupled to said sensing devices shiftable from a first stable condition by a "start" signal from one of said devices to a second stable condition and from said second stable condition to said first stable condition by a "stop" signal from the other of said devices, means coupling said sensing heads to said bistable circuit including polarity sensitive devices to limit the signals to said predetermined polarity, and a keying circuit connected to the output of said bistable circuit rendered operative when said bistable circuit is in said second stable condition in response to a "start" signal from the medium and rendered inoperative when said bistable circuit is in said first stable condition in response to a "stop" signal from the medium.

References Cited in the file of this patent

UNITED STATES PATENTS

| | | |
|---|---|---|
| 1,822,000 | Young | Sept. 8, 1931 |
| 1,844,950 | Finch | Feb. 16, 1932 |